(12) United States Patent
Shao et al.

(10) Patent No.: US 8,469,610 B2
(45) Date of Patent: Jun. 25, 2013

(54) OPTICAL CONNECTION SYSTEM WITH PLUG HAVING OPTICAL TURN

(75) Inventors: Bing Shao, Sunnyvale, CA (US); Seng-Kum Chan, Santa Clara, CA (US); Ye Chen, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 192 days.

(21) Appl. No.: 13/008,140

(22) Filed: Jan. 18, 2011

(65) Prior Publication Data
US 2012/0183256 A1  Jul. 19, 2012

(51) Int. Cl.
*G02B 6/36* (2006.01)

(52) U.S. Cl.
USPC .................................. 385/93; 385/76; 385/88

(58) Field of Classification Search
USPC ........................................................ 385/79, 93
See application file for complete search history.

(56) References Cited

U.S. PATENT DOCUMENTS

| | | | |
|---|---|---|---|
| 5,010,822 A * | 4/1991 | Folsom .......................... | 102/201 |
| 5,163,113 A * | 11/1992 | Melman ......................... | 385/31 |
| 6,385,374 B2 | 5/2002 | Kropp | |
| 6,454,470 B1 * | 9/2002 | Dwarkin et al. ................ | 385/93 |
| 6,709,607 B2 * | 3/2004 | Hibbs-Brenner et al. ...... | 216/24 |
| 6,722,793 B2 * | 4/2004 | Althaus et al. ................... | 385/92 |
| 6,901,185 B2 * | 5/2005 | Sasaki et al. ..................... | 385/33 |
| 6,945,712 B1 * | 9/2005 | Conn ................................ | 385/94 |
| 7,063,467 B2 * | 6/2006 | Nagasaka et al. ............... | 385/88 |
| 7,108,432 B2 * | 9/2006 | Nagasaka ........................ | 385/89 |
| 7,213,982 B2 | 5/2007 | Chen | |
| 7,298,941 B2 * | 11/2007 | Palen et al. ...................... | 385/33 |
| 7,404,679 B2 * | 7/2008 | Ebbutt et al. .................... | 385/78 |
| 7,539,367 B2 | 5/2009 | Tamura et al. | |
| 7,547,151 B2 * | 6/2009 | Nagasaka ........................ | 385/93 |
| 7,720,332 B2 * | 5/2010 | Park et al. ....................... | 385/33 |
| 8,078,022 B2 * | 12/2011 | Hamana et al. ................. | 385/32 |
| 8,100,589 B2 * | 1/2012 | Okubo et al. ................... | 385/89 |
| 8,277,129 B2 * | 10/2012 | Sabano et al. .................. | 385/83 |
| 2002/0114260 A1 * | 8/2002 | Kasama et al. ........... | 369/112.27 |
| 2004/0202477 A1 * | 10/2004 | Nagasaka et al. ............. | 398/138 |
| 2010/0135618 A1 * | 6/2010 | Howard et al. .................. | 385/79 |
| 2011/0305417 A1 * | 12/2011 | Wang et al. ..................... | 385/39 |
| 2012/0183256 A1 * | 7/2012 | Shao et al. ....................... | 385/39 |

FOREIGN PATENT DOCUMENTS

WO  2008022609 A1  2/2008

OTHER PUBLICATIONS

R. Krahenbuhl, et al., "Compact 90° Releasable Multifiber Optical Connectivity Solution," vol. 19, pp. 580-582, Apr. 15, 2007.

* cited by examiner

*Primary Examiner* — Rhonda Peace

(57) ABSTRACT

A connection system and method in which, when a plug portion is mated with a receptacle portion, a reflector in the plug portion can redirect optical signals between an end of an optical fiber in the plug portion and an opto-electronic device, such as a light source or light receiver, in the receptacle portion.

18 Claims, 7 Drawing Sheets

OPTICAL CONNECTION SYSTEM WITH PLUG HAVING OPTICAL TURN

BACKGROUND

In an optical communication system, it is generally necessary to couple an optical fiber to an opto-electronic transmitter, receiver or transceiver device and, in turn, to couple the device to an electronic system such as a computer or other processing system. These connections can be facilitated by modularizing the transceiver device. An opto-electronic transceiver module includes an opto-electronic light source, such as a laser, and an opto-electronic light receiver, such as a photodiode, and may also include various electronic circuitry associated with the laser and photodiode. For example, driver circuitry can be included for driving the laser in response to electronic signals received from the electronic system. Likewise, receiver circuitry can be included for processing the signals produced by the photodiode and providing output signals to the electronic system. The electronic and opto-electronic devices can be mounted on a small circuit board or similar substrate inside the transceiver module housing. The circuit board can include electrical contacts or connectors for connecting the opto-electronic transceiver to the external electronic system.

In some modular opto-electronic transceiver systems, an optical plug that terminates an optical fiber cable can be plugged into a socket in the transceiver module housing. When coupled to the transceiver module in this manner, the ends of optical fibers in the plug are optically aligned with optics in the opto-electronic transceiver. The optics couple electronic signals between the fibers and the laser and photodiode. A first fiber, which can be referred to as a transmit fiber, is optically coupled to the laser so that optical signals generated by the transceiver module are transmitted via that transmit fiber. A second fiber, which can be referred to as a receive fiber, is optically coupled to the photodiode so that optical signals received via the receive fiber can be received by the transceiver module.

In some opto-electronic transceiver modules, the optical signal path includes a 90-degree (90°) turn. For example, the above-described circuit board on which the laser and photodiode are mounted can be oriented perpendicularly or normal to the axes along which the optical signals are communicated with the optical fibers in the plug. The laser emits the optical transmit signal in a direction normal to the circuit board, and the photodiode receives the optical receive signal from a direction normal to the circuit board. The above-referenced optics in the transceiver module can include a first lens that collimates the optical transmit signal emitted by the laser and a second lens that focuses the optical receive signal upon the photodiode. A mirror or similar reflective element in the transceiver module can redirect the signals emitted by the laser and received by the photodiode at 90° angles with respect to the circuit board.

SUMMARY

Embodiments of the present invention relate to a connection system and method in which, when a plug portion is mated with a receptacle portion, a reflector in the plug portion can redirect light between an end of an optical fiber in the plug portion and an opto-electronic device, such as a light source or light receiver, in the receptacle portion.

The plug portion has, in addition to at least one optical fiber and the reflector, a plug optical port region and a plug body. The reflector is located between an end of the first optical fiber and the plug optical port region. The orientation of the reflector allows it to redirect light between an optical axis of the fiber and the plug optical port region. The light passes through the plug optical port region along a plug optical port axis.

The receptacle portion has, in addition to the opto-electronic device, a receptacle optical port region and a receptacle body. The opto-electronic device has a device optical axis that is aligned with the plug optical port axis when the plug portion and receptacle portion are in a mated position and the plug optical port region is adjacent the receptacle optical port region.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
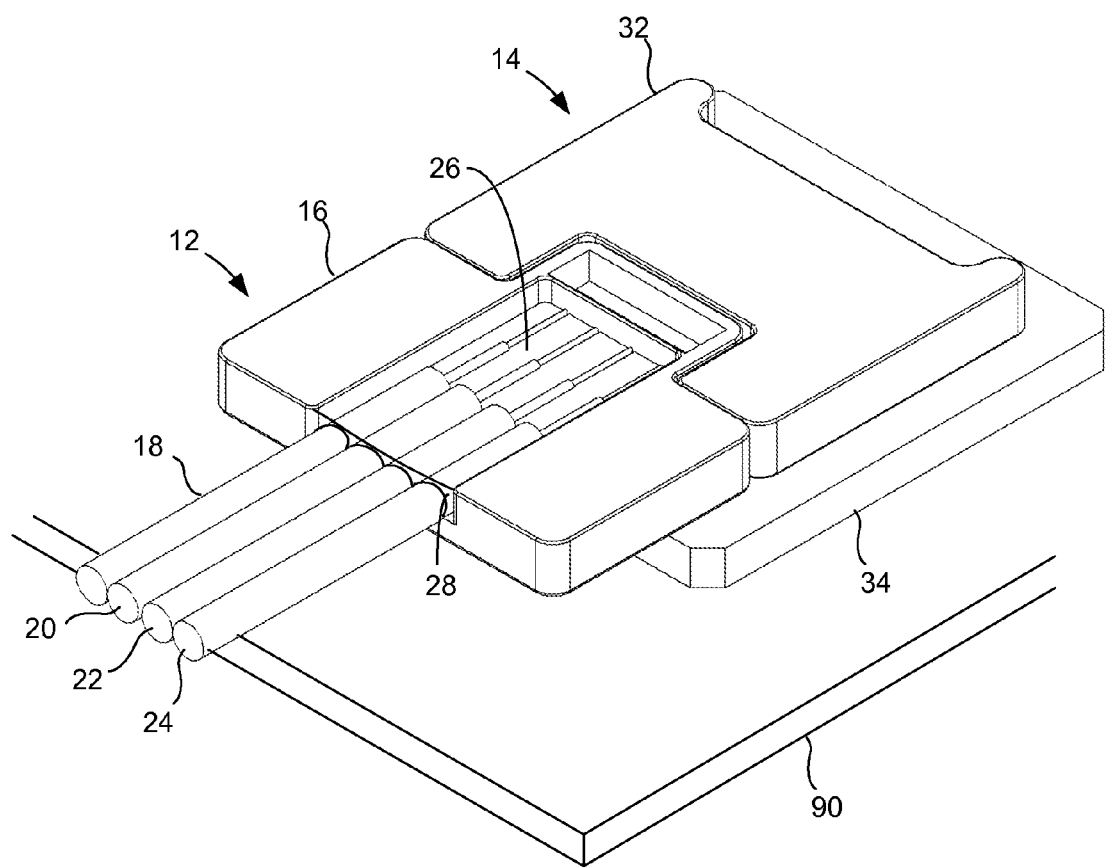
FIG. 1 is a perspective view of a connection system having a plug portion and a receptacle portion, in accordance with an exemplary embodiment of the invention.
Figure 2:
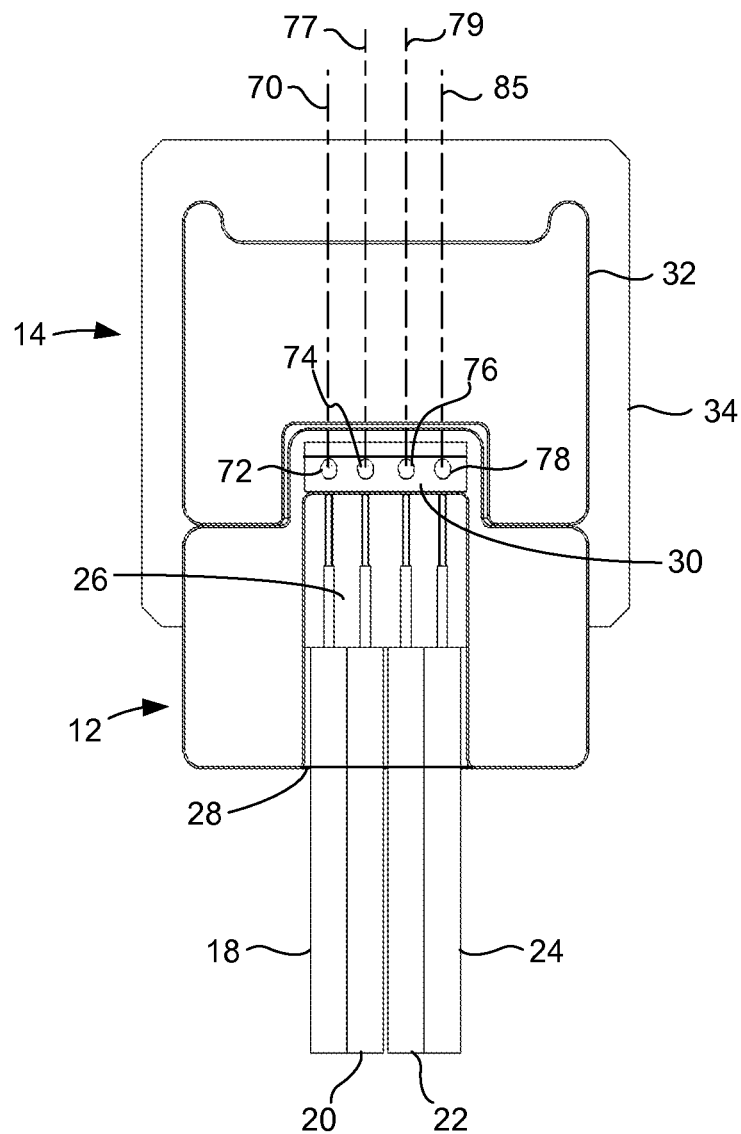
FIG. 2 is a top plan view of the connection system of FIG. 1, showing the plug portion and receptacle portion in a mated position.

As illustrated in FIGS. 1-2, in an illustrative or exemplary embodiment of the invention, a connection system includes a plug portion 12 and a receptacle portion 14. Although in the exemplary embodiment plug portion 12 may be perceived as having a plug-like appearance and receptacle portion 14 may be perceived as having a receptacle-like appearance, the terms "plug" and "receptacle" are used herein only for convenience of description. In other embodiments, for example, the features described herein as those of plug portion 12 can instead be provided in an assembly that may be perceived as more closely resembling a receptacle or socket (e.g., with a socket-like housing), and conversely, the features described herein as those of receptacle portion 14 can instead be provided in an assembly that may be perceived as more closely resembling a plug (e.g., with a plug-like housing). Structural limitations should not be inferred into the invention by the use of the terms "plug" and "receptacle" herein with regard to the exemplary embodiment. It should also be noted that in other embodiments (not shown) a plug portion and receptacle portion can be mounted within respective housings or other structures that include features that facilitate mating, including, for example, latching or engaging features that facilitate retaining the plug and receptacle portions in a mated position. Such a structure in which a plug or receptacle portion is included can be, for example, a connector housing. Alternatively, a structure in which a plug or receptacle portion is included can be, for example, an opto-electronic transceiver module housing.

Plug portion 12 includes a plug body 16 and retains the ends of optical fibers 18, 20, 22 and 24. Although in the exemplary embodiment, plug body 16 retains the ends of four optical fibers 18, 20, 22 and 24, in other embodiments such a plug body can retain the ends of more or fewer such optical fibers. The ends of optical fibers 18, 20, 22 and 24 can be retained within corresponding grooves (not shown) in a tray-like recessed area 26 in plug body 16. The end of each of optical fibers 18, 20, 22 and 24 can be stripped of its exterior sheath, thereby exposing the fiber end, and the extreme fiber end can be stripped of its cladding, thereby exposing the fiber core. Recessed area 26 can be filled with a suitable material such as epoxy resin 28 to secure the ends of optical fibers 18, 20, 22 and 24. The extreme fiber ends (i.e., the exposed cores) of optical fibers 18, 20, 22 and 24 abut the rear of a reflector 30 (FIG. 2) that is formed in plug body 16. The index of refraction of reflector 30 can be matched to the index of refraction of each of optical fibers 18, 20, 22 and 24 to promote optical coupling. The positioning of the extreme end of each of optical fibers 18, 20, 22 and 24 immediately adjacent to, i.e., abutting, reflector 30 also promotes optical alignment with the lens elements (described below) of reflector 30. It should be noted that plug body 16 and its reflector 30 can be made of optically transparent materials (i.e., transparent to the wavelengths carried by optical fibers 18, 20, 22 and 24 in operation). For example, a moldable optical thermoplastic, such as ULTEM® polyetherimide from SABIC (formerly General Electric Plastics Division) may be suitable. Epoxy resin 28 can be similarly transparent.

Figure 3:
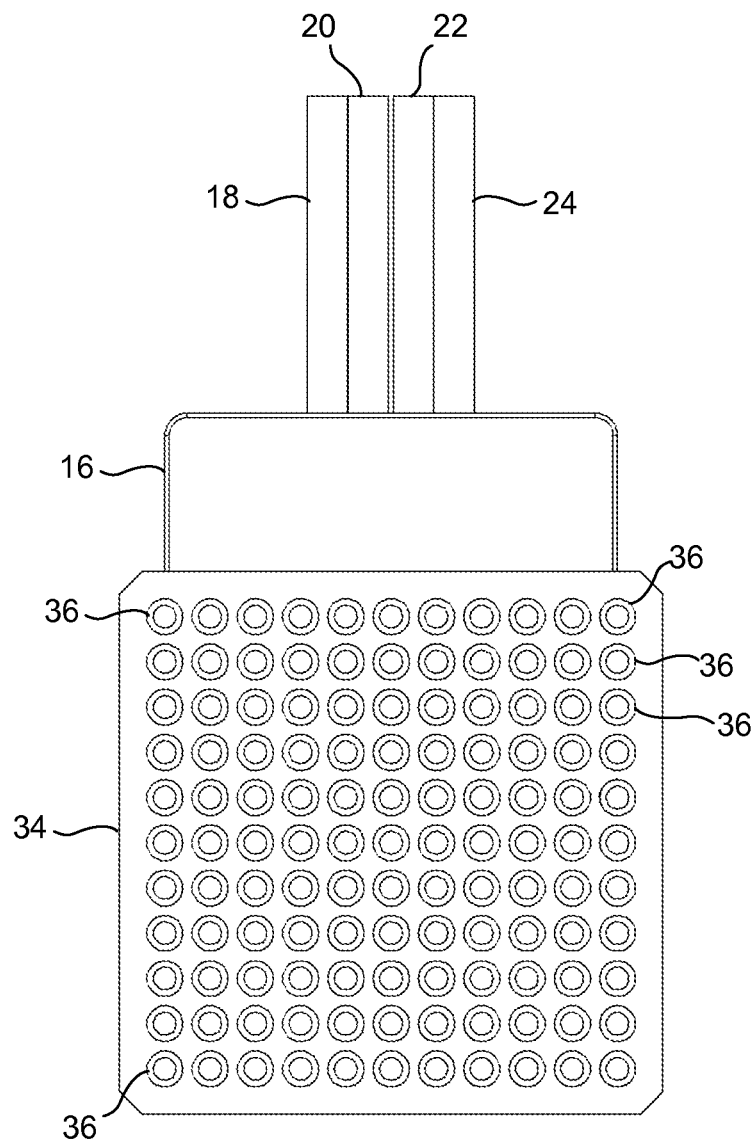
FIG. 3 is a bottom plan view of the connection system of FIG. 1, showing the plug portion and the receptacle portion in the mated position.

Receptacle portion 14 includes a receptacle body 32 mounted on the top surface of a printed circuit board substrate 34. As illustrated in FIG. 3, the bottom surface of printed circuit board substrate includes an array of electrical contacts 36, such as a ball-grid array (BGA). Receptacle body 32 can be made of a transparent, moldable optical thermoplastic, such as the above-referenced ULTEM® polyetherimide.

Figure 4:
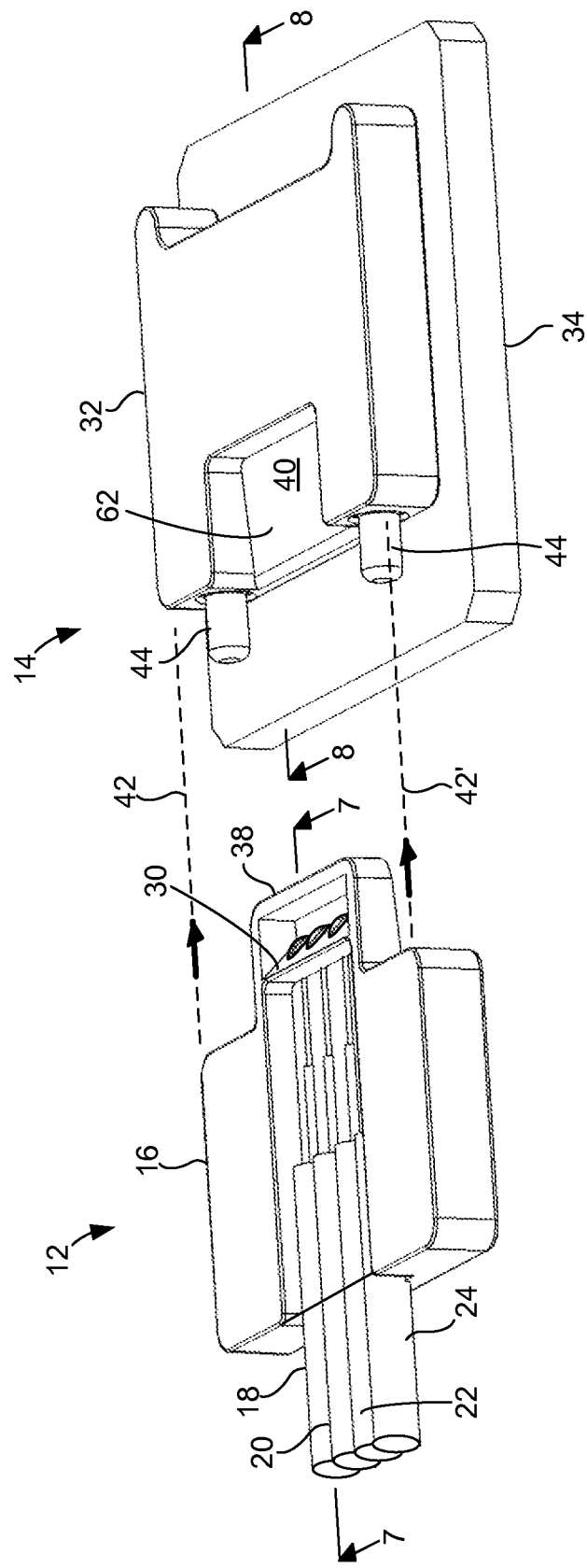
FIG. 4 is a perspective view the plug portion mating with the receptacle portion in the connection system of FIG. 1.

As illustrated in FIG. 4, plug portion 12 and receptacle portion 14 can be mated by moving plug portion 12 toward receptacle portion 14 in the direction indicated by the arrows in FIG. 4, until plug portion 12 and receptacle portion 14 arrive at the mated position (FIGS. 1-2). (However, in other embodiments, it may be more convenient or equally convenient to move a receptacle portion toward a plug portion.) In the mated position, a tongue 38 that extends from the remainder of plug body 16 is received in a recess 40 in the top of receptacle body 32. Note that plug portion 12 can be moved toward receptacle portion 14 toward the mated position in a direction generally along a mating axis 42. Nevertheless, in other embodiments such a plug portion and receptacle portion can be mated in any other suitable manner, such as by moving the plug portion in a direction perpendicular to that shown in FIG. 4, such that the tongue or a similar structure is lowered into a recess or similar receiving structure in the receptacle body. It should be noted that although in the exemplary embodiment a mechanical engagement between plug portion 12 and receptacle portion 14 is provided by tongue 38 fitting within recess 40, in other embodiments such a mechanical engagement can be provided in any other suitable manner. For example, in other embodiments a receptacle portion can include a mechanically mating structure that is different from a recess, and the plug portion can include a mechanically mating structure that is different from a tongue. In addition, in the exemplary embodiment, two protuberances 44 extending from receptacle body 32 are received in corresponding bores 45 (FIG. 5) in plug body 16 to aid alignment between plug portion 12 and receptacle portion 14 when mated.

Figure 6:
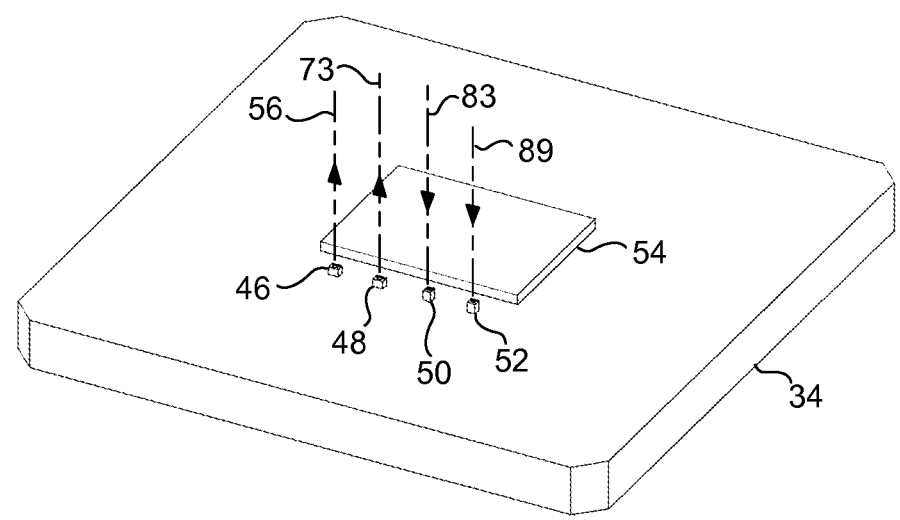
FIG. 6 is a perspective view of the receptacle portion of FIG. 1, with the receptacle body removed to show the opto-electronic and electronic devices mounted on the printed circuit board.

As illustrated in FIG. 6, on the top surface of printed circuit board substrate 34 are mounted a first opto-electronic light source 46, a second opto-electronic light source 48, a first opto-electronic light receiver 50, and a second opto-electronic light receiver 52. Opto-electronic light sources 46 and 48 can be, for example, vertical cavity surface-emitting lasers (VCSELs). Opto-electronic light receivers 50 and 52 can be, for example, photodiodes. Although in the exemplary embodiment receptacle portion 14 includes two light sources 46 and 48 and two light receivers 50 and 52, in other embodiments a receptacle portion can include more or fewer of such opto-electronic communication devices. An integrated circuit chip 54 is also mounted on the top surface of printed circuit board substrate 34. Although not shown for purposes of clarity, electrical interconnections such as printed circuit board traces, vias, bondwires, etc., connect opto-electronic light sources 46 and 48 to integrated circuit chip 54 and connect integrated circuit chip 54 to electrical contact array 36 (FIG. 3) as well as connect opto-electronic light receivers 50 and 52 to integrated circuit chip 54. Integrated circuit chip 54 can include driver circuitry (not shown) that drives opto-electronic light sources 46 and 48 in response to electrical input signals received from electrical contact array 36. Likewise, integrated circuit chip 54 can include receiver circuitry (not shown) that provides output signals to electrical contact array 36 in response to optical signal received by opto-electronic light receivers 50 and 52.

Figure 7:
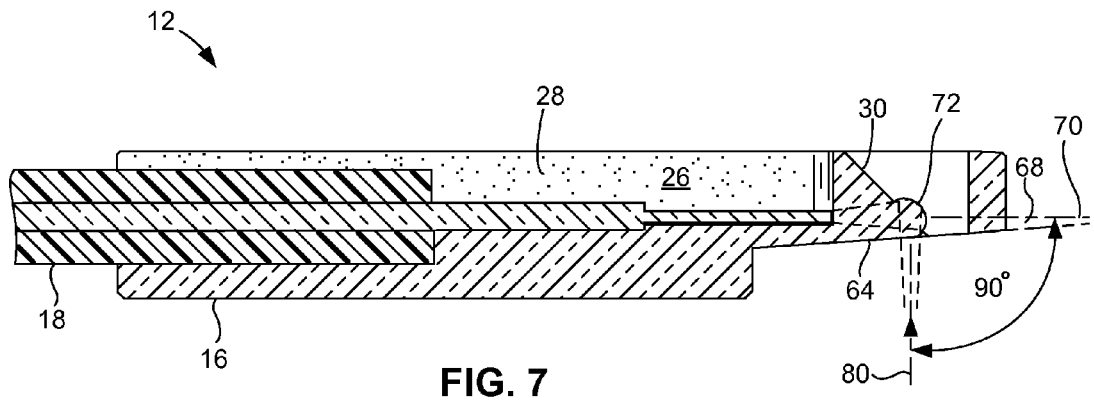
FIG. 7 is a sectional view taken on line 7-7 of FIG. 4.
Figure 8:
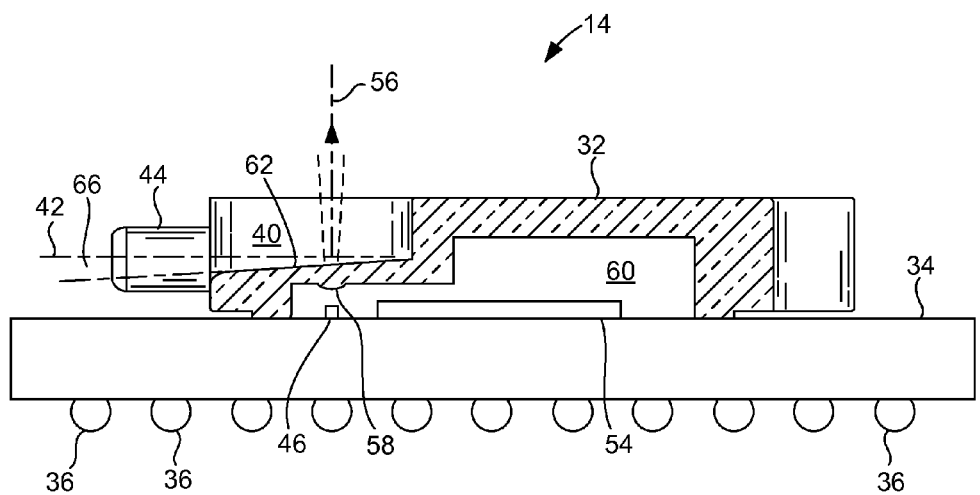
FIG. 8 is a sectional view taken on line 8-8 of FIG. 4.
Figure 9:
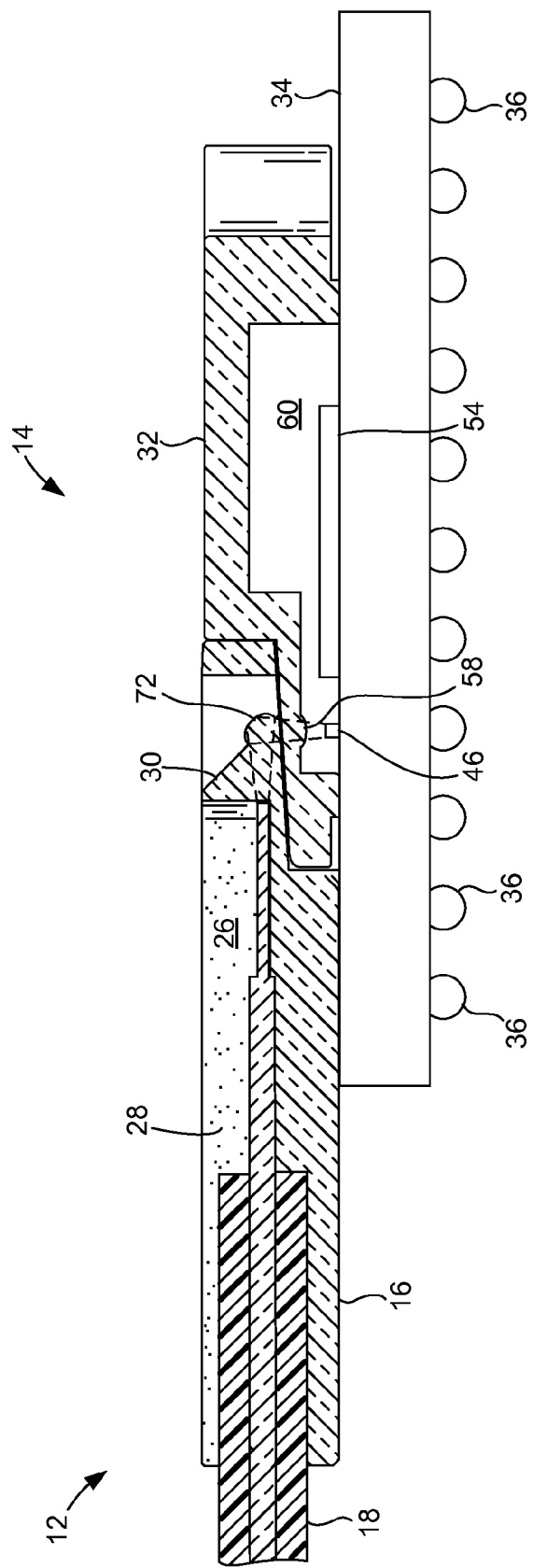
FIG. 9 is a sectional view showing the plug portion of FIG. 6 mating with the receptacle portion of FIG. 7.

As illustrated in FIGS. 7-9, when plug portion 12 and receptacle portion 14 are mated, optical signals (e.g., representing digital data) can be communicated between plug portion 12 and receptacle portion 14. Optical fibers 18 and 20 can be referred to as receive optical fibers because receptacle portion 14 can receive optical signals through them when plug portion 12 and receptacle portion 14 are mated. Similarly, optical fibers 22 and 24 can be referred to as transmit optical fibers because receptacle portion 14 can transmit optical signals through them when plug portion 12 and receptacle portion 14 are mated. For example, as illustrated in FIG. 8, light emitted by opto-electronic light source 46 along a first light source (device) optical axis 56 passes through a collimating lens 58 formed in receptacle body 32. Note that opto-electronic light sources 46 and 48 and opto-electronic light receivers 50 and 52 as well as integrated circuit chip 54 are mounted on printed circuit board substrate 34 within a cavity 60 in receptacle body 32.

The light beam or optical signal emitted by opto-electronic light source 46 along first light source optical axis 56 also passes through a planar surface 62 (FIG. 8) in recess 40 of receptacle body 32. The portion or region of planar surface 62 through which the light beam passes defines a receptacle optical port region. Planar surface 62 is oriented at an oblique angle with respect to first light source optical axis 56. This sloping or inclined orientation of planar surface 62 with respect to first light source optical axis 56 is useful because it inhibits undesirable reflection of ambient light when making a visual inspection of the alignment between opto-electronic light source 46 and collimating lens 58 along first light source optical axis 56 from a point above the top of receptacle portion 14 during manufacturing of receptacle portion 14. For example, manufacturing personnel can place receptacle portion 14 below a microscope and view the alignment between opto-electronic light source 46 and collimating lens 58 through the microscope. The angle 66 at which planar surface 62 of receptacle body 32 is inclined is shown in FIG. 8 with respect to the mating axis 42. Angle 66 is less than 90 degrees and preferably less than about 15 degrees. Similarly, the angle 68 at which a similar planar surface 64 of plug body 16 is inclined is shown in FIG. 7 with respect to a first transmit fiber optical axis 70 that represents the axis along which light is communicated through the extreme end of optical fiber 18. The complementary angles 66 and 68 aid mating of plug portion 12 and receptacle portion 14, as planar surface 62 abuts planar surface 64 when plug portion 12 and receptacle portion 14 are in the mated position (FIG. 9). Note that first transmit fiber optical axis 70 is parallel to mating axis 42 when plug portion 12 and receptacle portion 14 are in the mated position. Also note that first light source optical axis 56 is perpendicular, i.e., oriented at a 90-degree angle, to mating axis 42.

When plug portion 12 and receptacle portion 14 are in the mated position, the above-referenced collimated light beam or optical signal that is emitted by receptacle portion 14 along first light source optical axis 56 impinges upon and passes through planar surface 64 (FIG. 7) along a plug optical port first transmit axis 80. The portion or region of planar surface 64 through which the light beam passes defines a plug optical port region. When plug portion 12 and receptacle portion 14 are in the mated position, the plug optical port region and receptacle optical port region are adjacent one another. Note that when plug portion 12 and receptacle portion 14 are in the mated position, plug optical port first transmit axis 80 is coaxial with first light source optical axis 56. Reflector 30 is interposed between the ends of the optical fibers and the plug optical port region so as to redirect the light beam. In plug portion 12, a total internal reflection (TIR) mirror 72 formed on a surface of reflector 30 reflects or redirects the light beam at an angle of 90 degrees into the end of optical fiber 18 along first transmit fiber optical axis 70. The TIR mirror 72 not only redirects the light beam but also collimates it. Although in the exemplary embodiment reflector 30 includes TIR mirror 72 that redirects the light beam by total internal reflection, in other embodiments a reflector can include any other suitable type of optical feature for redirecting the light beam. For example, a reflector can have a reflective planar surface oriented at a 45 degree angle to the light beam.

Figure 5:
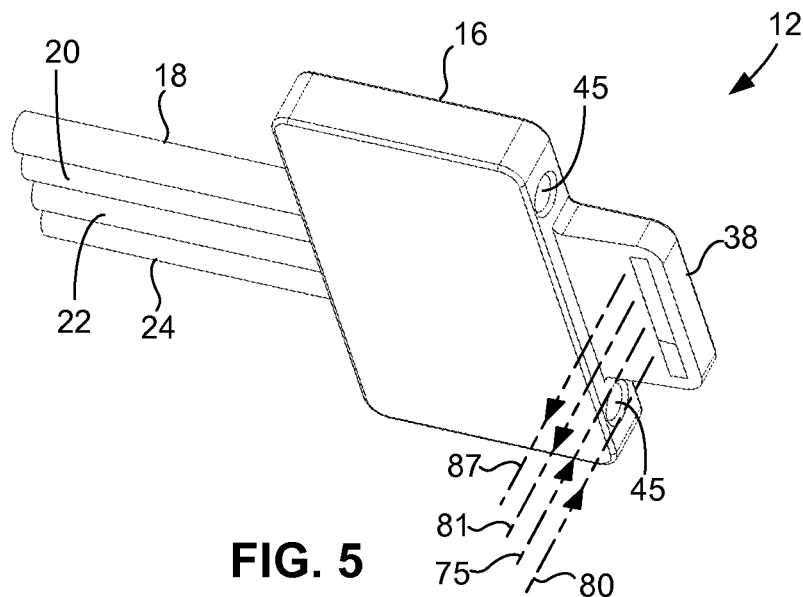
FIG. 5 is a bottom perspective view of the plug portion of the connection system of FIG. 1.

Other light beams or optical signals are communicated between the mated plug portion 12 and receptacle portion 14 in the same or a similar manner as that described above with regard to the transmission of the optical signal emitted by opto-electronic light source 46. A light beam emitted by opto-electronic light source 48 along a second light source optical axis 73 (FIG. 6) also passes through planar surface 62 of receptacle portion 14 (i.e., in the receptacle optical port region). This light beam continues through planar surface 64 of plug portion 12 (i.e., in the plug optical port region) along a plug optical port second transmit axis 75 (FIG. 5), is reflected by another such TIR mirror 74 (FIG. 2) on the surface of reflector 30, and is thus redirected by 90 degrees into the end of optical fiber 20 along a second transmit fiber optical axis 77 (FIG. 2). Similarly, a light beam emitted from the end of optical fiber 22 along a first receive fiber optical axis 79 (FIG. 2) is reflected by still another such TIR mirror 76 (FIG. 2) and thus redirected by 90 degrees through planar surface 64 of plug portion 12 (i.e., in the plug optical port region) along a plug optical port first receive axis 81 (FIG. 5). This light beam continues through planar surface 62 of receptacle portion 14 (i.e., in the receptacle optical port region) along a first light receiver optical axis 83 (FIG. 6) and impinges upon opto-electronic light receiver 50. Likewise, a light beam emitted from the end of optical fiber 24 along a second receive fiber optical axis 85 (FIG. 2) is reflected by yet another such TIR mirror 78 (FIG. 2) and thus redirected by 90 degrees through planar surface 64 of plug portion 12 (i.e., in the plug optical port region) along a plug optical port second receive axis 87 (FIG. 5). This light beam continues through planar surface 62 of receptacle portion 14 (i.e., in the receptacle optical portion region) along a second light receiver optical axis 89 (FIG. 6) and impinges upon opto-electronic light receiver 52.

Although not shown for purposes of clarity, receptacle body 32 includes another collimating lens similar to collimating lens 58 that is aligned with opto-electronic light source 50 for collimating light emitted by opto-electronic light source 50. Similarly, although not shown for purposes of clarity, receptacle body 32 includes two additional focusing lenses that are also similar in structure to lens 58 and aligned with opto-electronic light receivers 48 and 52, respectively, for focusing light upon opto-electronic light receivers 48 and 52.

Receptacle portion 14 can be mounted to an external circuit board 90 (FIG. 1) by soldering electrical contact array 36 to a corresponding array of pads on the external circuit board. The external circuit board can be part of a first device or system, such as a computer. Similarly, a second device or system, such as a computer peripheral device, can be coupled to the distal ends (not shown) of optical fibers 18, 20, 22 and 24. In operation, the first device can transmit optical signals to the second device via optical fibers 48 and 50 and can receive optical signals from the second device via optical fibers 52 and 54. The manner in which data can be communicated between such devices using optical signals in this manner is well understood in the art and therefore not described herein. Optical fibers 48 and 52 serve as a first bidirectional optical data communication channel, and optical fibers 50 and 54 serve as a second bidirectional optical data communication channel However, in other embodiments there can be more or fewer channels and correspondingly more or fewer optical fibers, opto-electronic devices, etc.

One or more illustrative embodiments of the invention have been described above. However, it is to be understood that the invention is defined by the appended claims and is not limited to the specific embodiments described.

What is claimed is:

1. A connection system, comprising:
a plug portion comprising a plug optical port region, a plug body, an end of a optical fiber, and a reflector, the reflector disposed between an end of the optical fiber and the plug optical port region, the reflector oriented to redirect light between a fiber optical axis of the optical fiber and a plug optical port axis in the plug optical port region; and
a receptacle portion comprising a receptacle optical port region, a receptacle body, and at least one opto-electronic signal communication device, the opto-electronic signal communication device having a device optical axis, the device optical axis aligned with the plug optical port axis when the plug portion and receptacle portion are in a mated position and the plug optical port region is adjacent the receptacle optical port region, wherein a planar surface of the receptacle body adjacent the opto-electronic signal communication device defines the receptacle optical port region, and the device optical axis intersects the planar surface at an oblique angle.

2. The connection system claimed in claim 1, wherein a planar surface of the plug body defines the plug optical port region, and the planar surface of the plug body abuts the planar surface of the receptacle body when the plug portion and receptacle portion are in a mated position.

3. The connection system claimed in claim 2, wherein the plug portion is received in the receptacle portion along a mating axis, the mating axis is parallel to the fiber optical axis, the planar surface of the plug body is offset from the mating axis by a non-zero plug surface angle, and the planar surface of the receptacle body is offset from the mating axis by receptacle surface angle complementary to the plug surface angle.

4. The connection system claimed in claim 3, wherein:
the planar surface of the receptacle body is a wall of a recess in the receptacle body; and
the planar surface of the plug body is a wall of a tongue of the plug body, and the tongue is received in the recess of the receptacle body when the plug portion and receptacle portion are in a mated position.

5. The connection system claimed in claim 1, wherein the reflector comprises a total internal reflection (TIR) element.

6. The connection system claimed in claim 1, wherein the reflector is oriented to redirect the light at an angle of 90 degrees.

7. The connection system claimed in claim 1, wherein the receptacle portion comprises a substrate, the opto-electronic signal communication device is mounted on the substrate, and the receptacle body is mounted on the substrate.

8. The connection system claimed in claim 7, wherein the receptacle body is mounted on a top surface of the substrate, and the bottom surface of the substrate includes an array of electrical contacts.

9. A connection system, comprising:
a plug portion comprising a plug optical port region, a plug body, an end of a transmit optical fiber, an end of a receive optical fiber, and a reflector, the reflector disposed between the end of the transmit optical fiber and the plug optical port region and between the end of the receive optical fiber and the plug optical port region, the reflector oriented to redirect light between a transmit fiber optical axis of the transmit optical fiber and a plug optical port transmit axis in the plug optical port region and to redirect light between a receive fiber optical axis of the receive optical fiber and a plug optical port receive axis in the plug optical port region; and
a receptacle portion comprising a substrate, a receptacle body mounted on the substrate, an opto-electronic light source mounted on the substrate and having a light source optical axis, an opto-electronic light receiver mounted on the substrate and having a light receiver optical axis, and a receptacle optical port region defined by a planar surface of the receptacle body adjacent the opto-electronic light source and opto-electronic light receiver, the light source optical axis and the light receiver optical axis intersecting the planar surface of the receptacle body at an oblique angle, the light source optical axis aligned with the plug optical port transmit axis and the light receiver optical axis aligned with the plug optical port receive axis when the plug portion and receptacle portion are in a mated position and the planar surface of the plug body abuts the planar surface of the receptacle body.

10. A method for using a connection system comprising a plug portion and a receptacle portion, the plug portion comprising a plug optical port region, a plug body, an end of a optical fiber, and a reflector, the reflector disposed between the end of the optical fiber and the plug optical port region, the receptacle portion comprising a receptacle optical port region, a receptacle body, and at least one opto-electronic signal communication device, the method comprising:
moving one of the plug portion and the receptacle portion into a mated position with the other of the plug portion and the receptacle portion, a device optical axis of the opto-electronic signal communication device aligned with a plug optical port axis of the plug portion when the plug portion and receptacle portion are in the mated position; and
the reflector redirecting light between a fiber optical axis of the optical fiber and the plug optical port axis, wherein the light is transmitted along the device optical axis at an oblique angle through a planar surface of the receptacle body adjacent the opto-electronic signal communication device that defines the receptacle optical port region.

11. The method claimed in claim 10, wherein a planar surface of the plug body defines the plug optical port region, and moving one of the plug portion and the receptacle portion into a mated position with the other of the plug portion and the receptacle portion comprises moving one of the plug portion and the receptacle portion with respect to the other of the plug portion until the planar surface of the plug body abuts the planar surface of the receptacle body.

12. The method claimed in claim 11, wherein moving one of the plug portion and the receptacle portion into a mated position with the other of the plug portion and the receptacle portion comprises moving one of the plug portion and the receptacle portion with respect to the other of the plug portion and the receptacle portion along a mating axis parallel to the fiber optical axis while one of the planar surface of the plug body and the planar surface of the receptacle body approaches the other of the planar surface of the plug body and the planar surface of the receptacle body at a non-zero angle with respect to the mating axis.

13. The method claimed in claim 10, wherein moving one of the plug portion and the receptacle portion into a mated position with the other of the plug portion and the receptacle portion comprises moving one of the plug portion and the receptacle portion with respect to the other of the plug portion and the receptacle portion until a tongue extending from the plug body is received in a recess in the receptacle body.

14. The method claimed in claim 10, wherein the reflector redirecting light between a fiber optical axis of the optical fiber and the plug optical port axis comprises a total internal reflection (TIR) element redirecting the light.

15. The method claimed in claim 10, wherein the reflector redirecting light between a fiber optical axis of the optical fiber and the plug optical port axis comprises the reflector redirecting the light at an angle of 90 degrees.

16. The method claimed in claim 10, wherein the optical fiber is a transmit optical fiber, the plug portion further comprises an end of a receive optical fiber, the opto-electronic signal communication device comprises an opto-electronic light source, and the receptacle portion further comprises an opto-electronic light receiver, the reflector redirects light emitted by the opto-electronic light source along a light source optical axis into an end of the transmit optical fiber, and the reflector redirects light emitted from the end of the receive optical fiber into the opto-electronic light receiver along the light receiver optical axis.

17. The method claimed in claim 16, wherein the reflector redirects light emitted by the opto-electronic light source through a planar surface of the receptacle body defining the plug optical port region along a light source optical axis oriented at an oblique angle with respect to the planar surface of the receptacle body, and the reflector redirects light emitted from an end of the receive optical fiber through the planar surface of the receptacle body defining the receptacle optical port region along a light receiver optical axis oriented at an oblique angle with respect to the planar surface of the receptacle body.

18. The method claimed in claim 16, further comprising:
communicating electrical signals among the opto-electronic light source, an integrated circuit device of the receptacle portion, and an array of electrical contacts of the receptacle portion; and
communicating electrical signals among the opto-electronic light receiver, the integrated circuit device of the receptacle portion, and the array of electrical contacts of the receptacle portion.

* * * * *